United States Patent [19]
Bergeron, Sr.

[11] Patent Number: 5,141,109
[45] Date of Patent: Aug. 25, 1992

[54] SHIPPING CONTAINER OF SCRAP GYPSUM BOARD AND USED FOR TRANSPORTING GYPSUM BOARD SCRAP FOR RECYCLING

[76] Inventor: Louis A. Bergeron, Sr., 100 Scott St., Tonawanda, N.Y. 14150

[21] Appl. No.: 759,509

[22] Filed: Sep. 13, 1991

[51] Int. Cl.⁵ .......................................... B65D 27/00
[52] U.S. Cl. ................................................ 206/599
[58] Field of Search .................. 206/599, 524.1, 524.6; 220/660; 229/DIG. 2

[56] References Cited

U.S. PATENT DOCUMENTS

| | | | |
|---|---|---|---|
| 2,833,403 | 5/1958 | Benschoter | 206/599 X |
| 3,248,037 | 4/1966 | Simkins | 206/599 X |
| 4,790,249 | 12/1988 | Webb | 206/599 X |

*Primary Examiner*—Steven M. Pollard

[57] ABSTRACT

A shipping container constructed primarily of pieces of scrap gypsum board and designed for use in handling and transporting gypsum board scrap from various building sites to the manufacturer of gypsum board for recycling. The bottom or floor and the top or closure of the container consists of larger pieces of scrap such as the pieces left from cutting out spaces for windows or doors or other openings.

The four vertical side walls of the container are composed of stacked layers of approximately 8 inch wide strips of gypsum board scrap, the joints at the four corners being staggered every several layers to provide added strength or stability to the structure.

While the container is still open at the top before the top cover board is put on the container to close it, the container is filled with smaller pieces of gypsum board scrap which usually is run through a chipping machine to break it down into relatively small pieces of scrap waste.

Each container or unit is usually about four feet square and of structurally stable height. Each container unit is supported upon two or three pedestals that are also composed of narrow, stacked strips of gypsum board scrap, so that a forked lift truck can be moved under the completed and filled container and transfer it with other similar units to a flat bed truck for transportation to the manufacturer for recycling.

The container is bound together by two or three metal or plastic or fiber glass bands, straps, tapes or ribbons which encircle the container, including the pedestals, and are fastened tightly around the unit to provide added stability against breakdown or failure during handling and transportation.

3 Claims, 3 Drawing Sheets

SHIPPING CONTAINER OF SCRAP GYPSUM BOARD AND USED FOR TRANSPORTING GYPSUM BOARD SCRAP FOR RECYCLING

BACKGROUND AND SUMMARY OF THE INVENTION

This invention relates to a shipping container constructed mainly of larger pieces of scrap gypsum board and used for handling and transportation gypsum board scrap from various buildsites to the manufacturer of gypsum board for recycling. The bottom or floor and the top or closure of the container consists of larger pieces of scrap such as the pieces left over from cutting out spaces for windows, doors or other openings.

The four vertical side walls of the container are made from stacked layers of approximately eight inch wide strips of gypsum board scrap laid down flat to form a wall about 8 inches thick, with the joints between the adjoining sides of the container being staggered at the corners every several layers to provide added strength and stability to the structure.

While the container unit is still open at the top before the top or closure board is put on the container to close it, the container is filled with smaller pieces of gypsum board scrap usually is run through a chipping machine to break it down into relatively small pieces of scrap waste.

Each container or unit is usually about four feet square and of structurally stable height, although a double sized unit four feet by eight feet can be used, if desired. Each container unit is supported above the ground or floor upon two or three pedestals that are also composed of narrow, stacked strips of gypsum board scrap, so that a forked lift truck can be moved under the completed and filled bed truck or other suitable conveyance for transportation to the manufacturer for recycling.

The container and its pedestals are bound together by two or three metal, plastic or fiber glass bands, straps, tapes, ribbons or cords which encircle the container, including the pedestals, and are fastened tightly around the unit by clips or otherwise to provide added stability against breakdown or failure during handling and shipping.

Heretofore, standard practice has been to dispose of gypsum board scrap or waste in waste landfill dumps with no attempt at recycling, but current indications are that some form of legislation will be likely to be passed in the near future that will prohibit such dumping.

A patentability search failed to disclose any prior art teaching or suggesting the use of scrap gypsum board for forming a container for handling and transporting a product, and especially as a container for the transportation of gypsum board scrap for recycling. The following United States patents revealed by such a search are listed for the record, and are: U.S. Pat. Nos. 1,632,952; 2,860,772; 3,023,890; 3,025,955; 3,709,382; 4,142,471 and 4,650,084.

It is therefore an object of the present invention to provide an inexpensive and easily constructed shipping container for handling and transporting gypsum board scrap from various building sites to the manufacturer of gypsum board for recycling.

It is a further object to provide a shipping container constructed primarily of pieces of scrap gypsum board whereby not only the small pieces and chips of gypsum board scrap being shipped, but also the container itself is used as part of the recycled product.

These and other objects and advantages accruing from the present invention will become apparent as this description proceed.

DETAILED DESCRIPTION OF THE DRAWINGS

The features and operation, as well as the advantages, of the present invention will become further apparent upon consideration of the following description taken in conjunction with the accompanying drawings, wherein FIG. 1 is a perspective view of the proposed container complete and ready for shipping, including the supporting pedestal as seen from above;

DETAILED DESCRIPTION OF THE INVENTION

Figure 1:
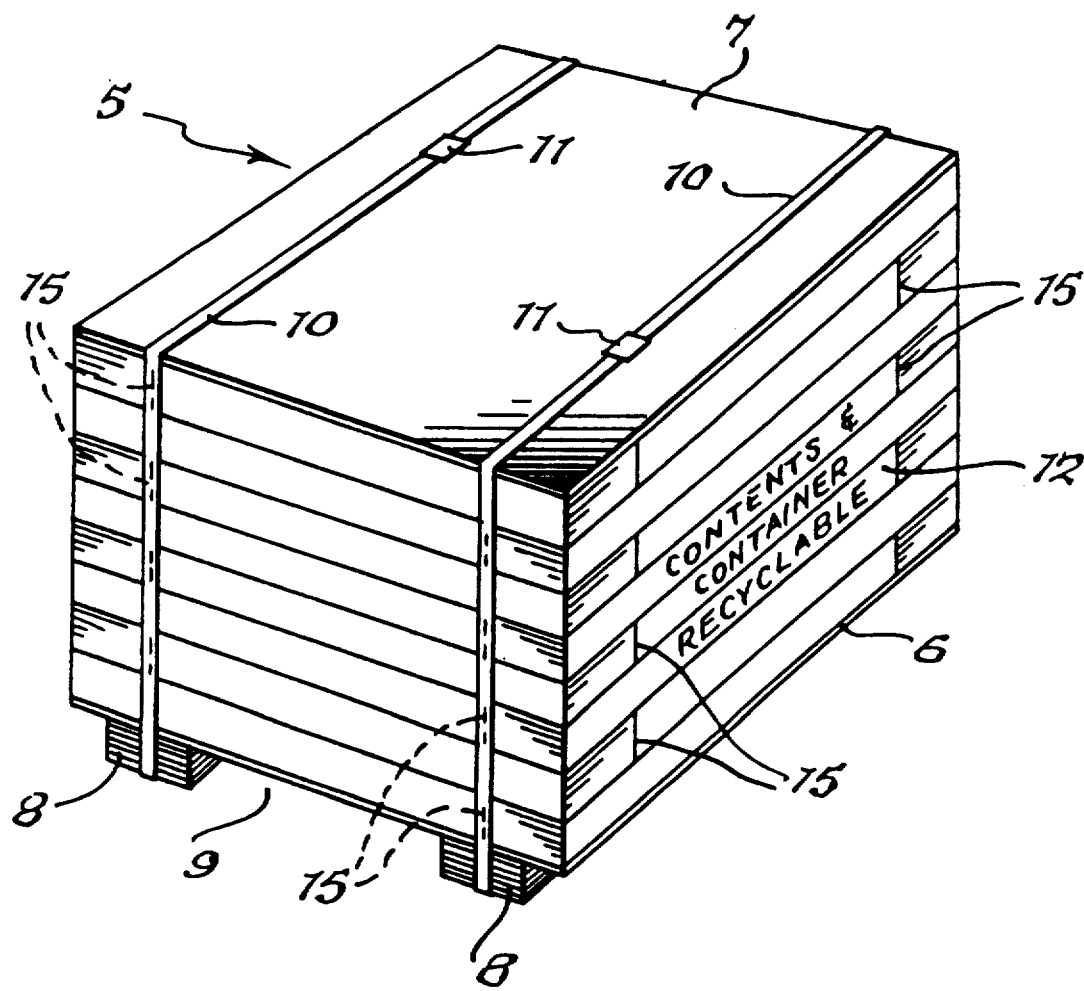
Figure 2:
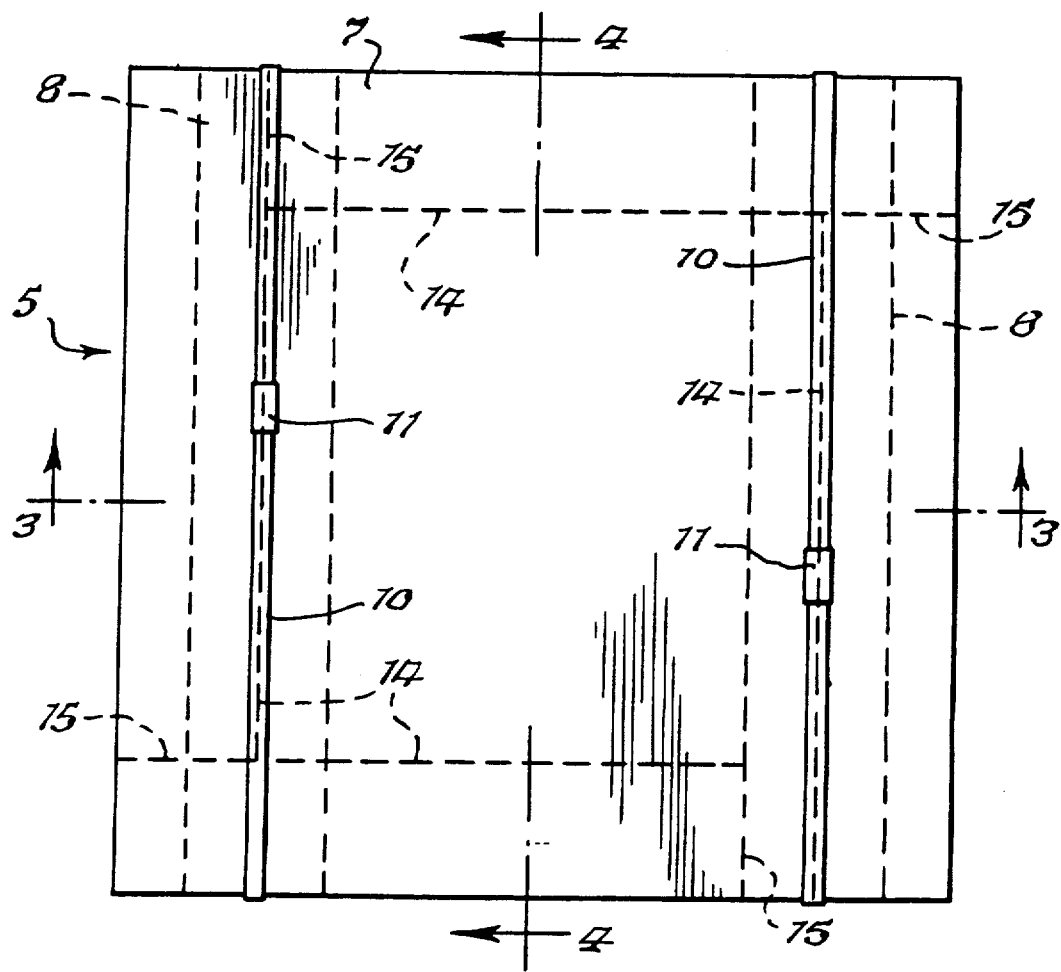
FIG. 2 is a top plan view of the container.

Referring further to the drawings, and specifically to FIG. 1, the complete container 5 ready for transportation comprises the bottom or floor piece 6 and top or closure 7 which are large pieces of scrap gypsum board which have been damaged or otherwise found defective or are obtained when doors, windows or other large openings are created by cutting the openings from the full size gypsum board to provide the desired openings. Each container unit is usually four feet by four feet square, although, if desired, a double size unit four feet by eight feet can be constructed. The container itself is supported upon two or more pedestals which are likewise composed of larger pieces or strips of scrap gypsum board and are used to support the container itself above the ground or floor so that a forked lift truck can be easily moved under the container in the space 9 beneath the container which can then be lifted off the ground or floor and deposited onto the floor of a flat bed truck or other conveyance along with other similar container units for transportation to the gypsum board manufacturer for recycling. The entire structure including the pedestals 8 is bound together by two or more shipping bands, straps, ribbons, tapes, cords or wires 10 which surround and encircle the container and pedestals and are secured tightly about the structure by clips 11 or the like. These banding ribbons or tapes can be of metal, plastic or fiber glass or any material of suitable strength and durability. Also, a tag, label or a clear space 12 is provided on the container for the purpose of marking and identifying the origin or source of the material from which the structure is made and which it contains as additional assurance to the manufacturer that the material from which the container is constructed and the contents are of the thusly identified origin and are free of extraneous dirt or other contamination that might render the material unfit for recycling.

Figure 3:
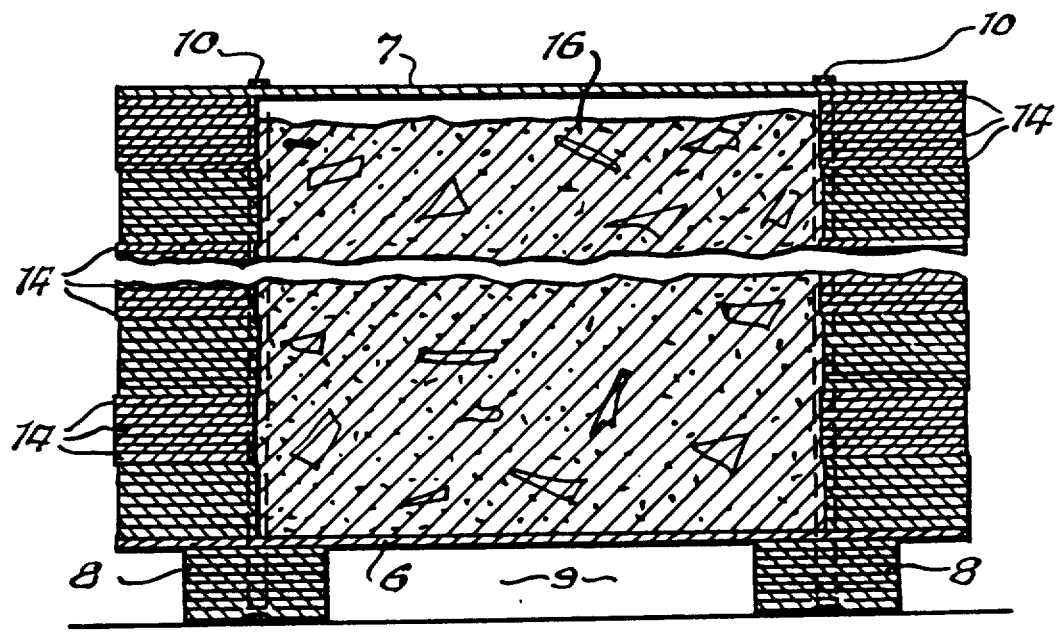
FIG. 3 is a vertical cross-sectional view of the container taken along the line 3—3 of FIG. 2.
Figure 4:
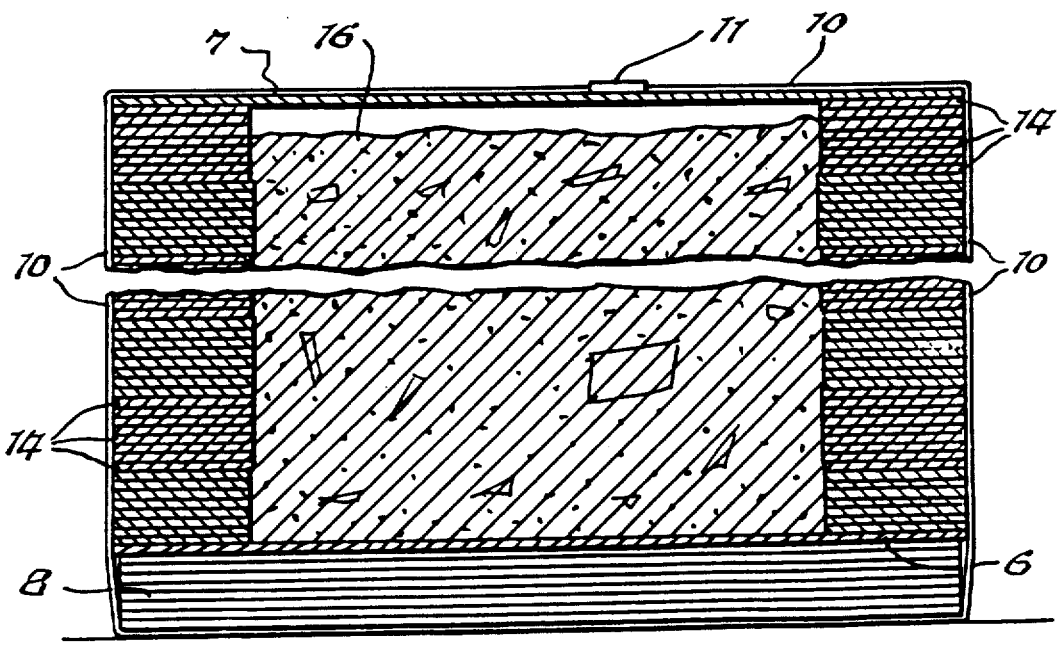
FIG. 4 is a vertical, cross-sectional view of the container taken along the line 4—4 of FIG. 2.

Referring more specifically to FIGS. 3 and 4, the four vertical side walls of the container are formed of stacked layers of approximately eight inch wide strips 14 of gypsum board scrap, the joints 15 at the four corners being staggered every several, such as five or six, layers of scrap to provide added strength or stability to the structure.

As stated earlier, each container is usually about four feet square in outside dimensions and of structurally stable height, and is supported upon two or three pedestals that are also made of stacks of narrow strips of gypsum board scrap around eight inches wide, so that the forks of a lift truck can be moved beneath the completed and filled container and transfer it with other similar units or containers to a flat bed truck or other suitable conveyance for transportation to the manufacturer for recycling.

While the container is still open at the top before the top closure board is put on the container to close it, the container is filled with smaller pieces of gypsum board scrap 16 which may be and usually is run through a chipping machine to break it down into relatively small pieces of scrap waste.

The container, including the pedestals, is bound together by two or three metal or plastic or fiber glass bands, straps, tapes or ribbons which are used to encircle the container and pedestals and to be drawn and fastened tightly around the container and pedestals to hold them together as a unit and provide added stability against breakdown or failure during handling and transportation.

It is obvious from the above description that the present concept offers a very inexpensive and convenient way of handling and transporting gypsum board scrap from various building sites to the manufacturer for recycling. It is likewise apparent that by utilizing the larger pieces of scrap gypsum board to construct the entire container, including everything but the banding straps, that maximum utilization of shipping space is obtained, inasmuch as the container as well as the contents are usable as the recyclable material.

Having described the invention, it is desired to claim:

1. A shipping container for handling and transporting gypsum board scrap, said container being constructed of pieces of scrap gypsum board and comprising a bottom floor of a large piece of scrap gypsum board, a top closure piece of scrap gypsum board, said top and bottom pieces being held apart by four vertical side walls composed of stacked, narrow strips of scrap gypsum board, the joints at the corners of the container between adjoining side walls being staggered every several layers of the said gypsum board strips, said container being supported above floor or ground level by a plurality of pedestals composed of stacked narrow strips of scrap gypsum board, the container and pedestals being held together by banding straps fastened tightly encircling the container and pedestals, the container cavity being filled with smaller pieces of gypsum board scrap.

2. A shipping container according to claim 1 in which the outside peripheral dimensions of the container are approximately four feet by four feet.

3. A shipping container according to claim 1 in which the strips of gypsum board forming the vertical side walls are approximately eight inches wide.

* * * * *